United States Patent
Davidson

(10) Patent No.: US 7,325,950 B2
(45) Date of Patent: Feb. 5, 2008

(54) HEADLIGHT ANTIGLARE DEVICE

(76) Inventor: Robert M. Davidson, 301-2305 Adelaide Street East, Saskatoon, Saskatchewan (CA) S7J 5H6

( * ) Notice: Subject to any disclaimer, the term of this patent is extended or adjusted under 35 U.S.C. 154(b) by 0 days.

(21) Appl. No.: 11/331,156

(22) Filed: Jan. 13, 2006

(65) Prior Publication Data

US 2006/0256571 A1   Nov. 16, 2006

(30) Foreign Application Priority Data

May 10, 2005  (CA) .................................. 2,506,873

(51) Int. Cl.
  *F21V 7/05*  (2006.01)
(52) U.S. Cl. .................. 362/460; 362/515; 362/279; 362/282; 362/301; 362/325; 362/323
(58) Field of Classification Search .............. 362/460, 362/509, 512, 514, 516, 279, 282, 301, 325, 362/322, 323, 505
See application file for complete search history.

(56) References Cited

U.S. PATENT DOCUMENTS

| 615,490 A | 12/1898 | Metternich |
| 1,141,718 A * | 6/1915 | Martin ........................ 362/517 |
| 1,328,692 A | 1/1920 | Richard |
| 1,388,567 A | 8/1921 | Hoffman |
| 1,467,194 A * | 9/1923 | Petersen .................... 362/279 |
| 1,563,656 A | 12/1925 | Radloff |
| 2,719,216 A | 9/1955 | Brewer |
| 2,784,303 A | 3/1957 | Heiser |
| 3,079,529 A * | 2/1963 | Novinger .................... 315/82 |
| 3,604,922 A * | 9/1971 | Steel .......................... 362/283 |
| 6,070,999 A | 6/2000 | Kamps et al. |

* cited by examiner

*Primary Examiner*—Sharon E. Payne
(74) *Attorney, Agent, or Firm*—Ryan W. Dupuis; Michael R. Williams; Adrian D. Battison

(57) ABSTRACT

An antiglare device comprises a housing for coupling to a headlight of a vehicle. Surfaces of the housing which face a passenger side of the vehicle are reflective to encourage reflection of light away from oncoming traffic while surfaces of the housing facing towards the driver side of the vehicle are preferably non-reflective to reduce the amount of light reflected towards oncoming traffic. Plates may be supported within the housing through which the light passes in which the plates similarly include reflective and non-reflective surface. The plates may be pivotal between a high beam position parallel to the direction of light projected through the housing and a low beam position in which the plates are deflected in the direction in which the reflective surfaces face towards the passenger side. The plates may instead be horizontal in the high beam position and deflected downwardly in the low beam positions.

18 Claims, 7 Drawing Sheets

HEADLIGHT ANTIGLARE DEVICE

FIELD OF THE INVENTION

The present invention relates to an antiglare device for use in conjunction with a headlight of a vehicle for reducing headlight glare perceived by oncoming traffic.

BACKGROUND

A common annoyance to drivers of vehicles at night is the glare of headlights of oncoming vehicles. In some instances the glare is sufficient from oncoming traffic to temporarily blind a driver so as to result in a considerable safety concern. Various attempts have been made to reduce glare as described in prior U.S. Pat. No. 1,328,692 to Richard, 615, 490 to Metternich, U.S. Pat. No. 1,388,567 to Hoffman, U.S. Pat. No. 1,563,656 to Radloff, U.S. Pat. No. 2,784,303 to Heiser, U.S. Pat. No. 2,719,216 to Brewer and U.S. Pat. No. 6,070,999 Kamps et al. Prior art attempts to reduce glare generally involve forming an elongate tube through which the headlight is projected to produce a spotlight effect which reduces glare by narrowing the scatter of light in all directions. While this may assist in reducing glare to oncoming traffic, light is also reduced in desirable directions important for safe driving of the vehicle at night.

SUMMARY OF THE INVENTION

According to one aspect of the invention there is provided a headlight antiglare device for use in conjunction with a headlight of a vehicle, the device comprising:

a housing having a rear opening, a front opening, a first side wall and a second side wall, the side walls defining a passage extending through the housing along a main axis of the housing between the rear opening and the front opening;

mounting means for receiving the headlight in the rear opening such that the headlight shines through the housing along the main axis, the first side wall faces a passenger side of the vehicle and the second side wall faces a driver side of the vehicle;

the first side wall having a reflective surface; and the second side wall having a non-reflective surface.

According to a second aspect of the present invention there is provided a headlight antiglare device for use in conjunction with a headlight of a vehicle, the device comprising:

a housing having a rear opening, a front opening and a passage extending through the housing along a main axis of the housing between the rear opening and the front opening;

mounting means for receiving the headlight in the rear opening such that the headlight shines through the housing along the main axis; and a plurality of plates supported within the housing in an upright orientation, spaced apart from one another and parallel to the main axis of the housing.

According to a third aspect of the present invention there is provided a headlight antiglare device for use in conjunction with a headlight of a vehicle, the device comprising:

a housing having a rear opening, a front opening and a passage extending through the housing along a main axis of the housing between the rear opening and the front opening;

mounting means for receiving the headlight in the rear opening such that the headlight shines through the housing along the main axis;

a plurality of plates, each including a first reflective side and a second non-reflective side, the plates being supported within the housing parallel to and spaced apart from one another such that the first reflective sides face a common first direction and the second non-reflective sides face an opposing common second direction.

According to a further aspect of the present invention there is provided a headlight antiglare device for use in conjunction with a headlight of a vehicle, the device comprising:

a housing having a rear opening, a front opening and a passage extending through the housing along a main axis of the housing between the rear opening and the front opening;

mounting means for receiving the headlight in the rear opening such that the headlight shines through the housing along the main axis;

a plurality of plates supported within the housing parallel to and spaced apart from one another, the plates being movable between a high beam position in which the plates are substantially parallel to the main axis of the housing and a low beam position in which the plates lie parallel to one another at an acute angle to the main axis.

Use of alternating reflective and non-reflective surfaces is particularly useful for reducing the scatter of light in one direction only to minimize glare towards oncoming traffic while maintaining illumination along the shoulder of the road for driver safety. Use of vertically oriented plates also prevents scatter of light in a lateral direction towards oncoming traffic while maximizing the light projected forwardly along the road. Plates may also be provided which are pivotal between respective high beam and low beam positions to control the degree to which glare is reduced for oncoming traffic.

In some embodiments, the plates have a fixed orientation substantially parallel to the main axis. Alternatively, the plates may be upright in the high beam position and pivotal about respective upright axes between the high and low beam positions or substantially horizontal in the high beam position and pivotal about respective horizontal axes between the high and low beam positions.

There may be provided a controller coupled to the plates for moving the plates together between the high beam and low beam positions respectively. The controller is preferably operable by operator controls within the passenger compartment of the vehicle.

The first reflective sides preferably face partially rearward in the low beam position for deflecting light downward or laterally outward towards a passenger side of the vehicle, away from oncoming traffic.

The mounting means may include a sealing member for sealing engagement between the headlight and a periphery of the rear opening and threaded fasteners mounting the headlight to the housing for selective separation of the headlight and the housing when the headlight requires replacement.

In some embodiments, the mounting means support the housing recessed within a bumper of the vehicle.

When horizontal space is a problem, the mounting means may comprise a reflector facing the rear opening at an upward facing 45 degree inclination thereto and a support flange for supporting the headlight facing downwardly above the reflector.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
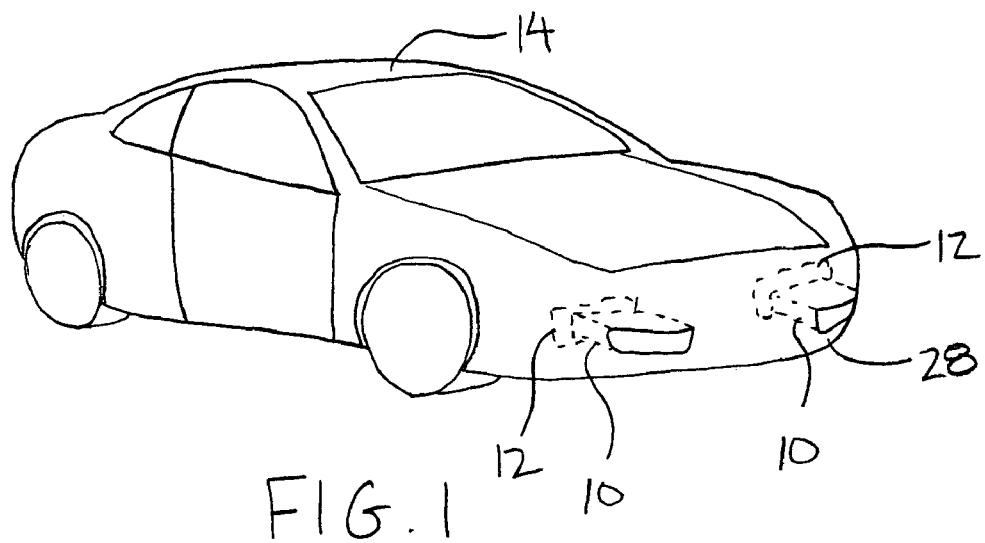
FIG. 1 is a perspective view of a vehicle schematically illustrating the mounting location of the antiglare device in accordance with a first embodiment.

Referring to the accompanying Figures there is illustrated an antiglare device generally indicated by reference numeral 10. The device 10 is particularly suited for use with headlights 12 of a vehicle 14 to reduce the glare of light projected towards oncoming traffic. While various embodiments are shown in the accompanying drawings, the common features will first be described herein.

The device 10 includes a housing 16 comprising a duct of rectangular cross section extending between a front opening 18 and a rear opening 20. The housing includes a first side wall 22 and a second side wall 24 which are parallel and opposite from one another for defining the passageway of the duct therebetween. The passageway extends along a main axis of the housing between the front and rear openings.

A mounting flange 26 extends about the rear opening 20 at the rear of the housing 16 for sealing engagement with a periphery of the headlight 12. The flange 26 receives caulking or other suitable sealing material for sealing the periphery of the rear opening fully about the headlight so that all projected light from the headlight is projected through the housing 16 along the main axis thereof towards the front opening 18. Screws are provided for selectively securing the headlight to the housing for later replacement of the headlight as required.

Figure 2:
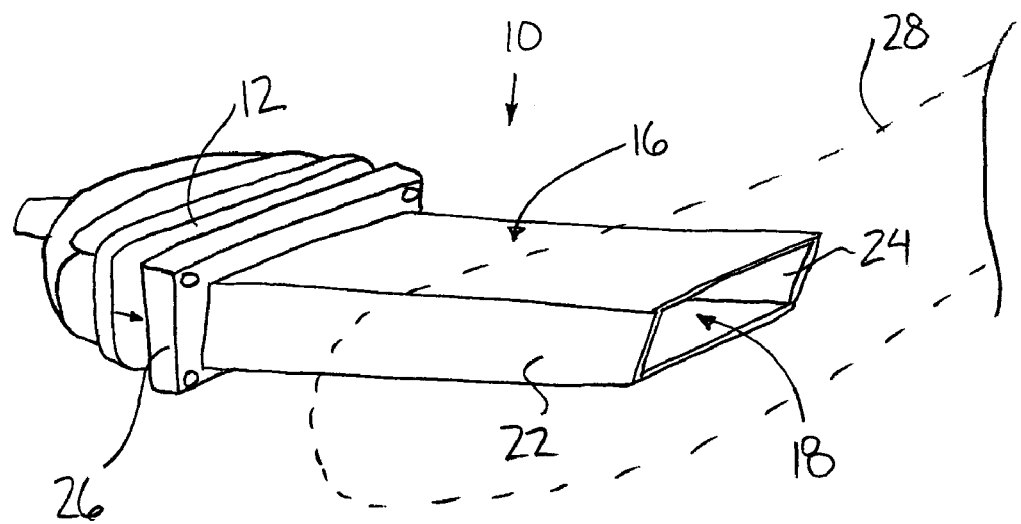
FIG. 2 is a perspective view of the first embodiment of the antiglare device.
Figure 4:
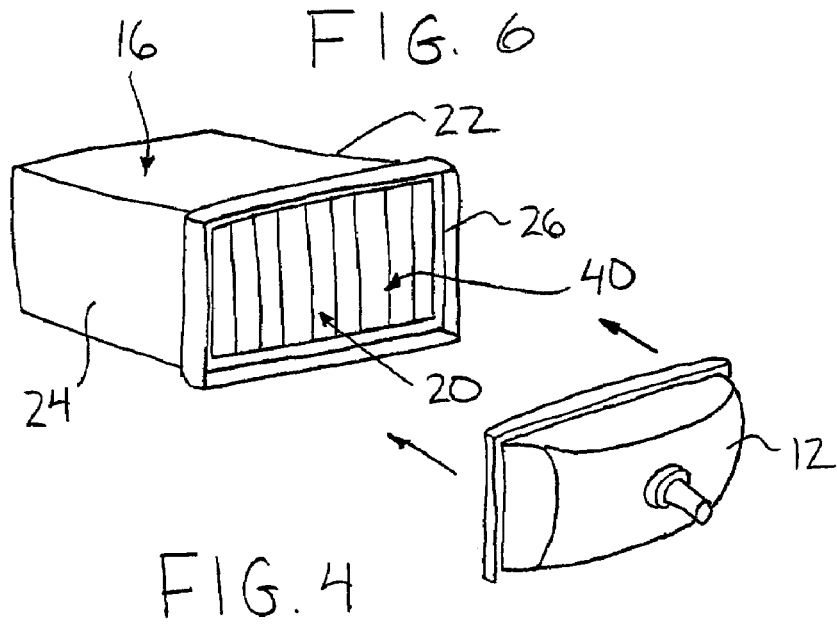
FIG. 4 and FIG. 5 are perspective views of the antiglare device according to FIG. 3 which supports fixed plates therein.

The housing 16 and headlight 12 associated therewith is mounted within the bumper 28 of the vehicle at lower elevation as compared to conventional headlights. As shown in FIGS. 2 and 4, the mounting flange 26 supports the headlight so that the path of light projected from the beam is parallel to the main axis.

Figure 6:
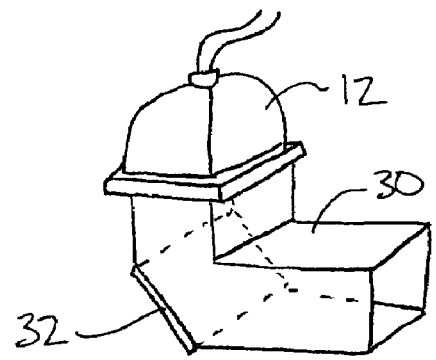
FIG. 6 is a perspective view of an alternate mounting means for coupling a headlight to the antiglare device for use with various embodiments of the antiglare device.

In a further embodiment as shown in FIG. 6, the housing 16 may be coupled to the headlight 12 by a suitable reflector housing 30 including a reflector 32 therein. The reflector housing 30 includes a first vertical portion supporting the headlight 12 at a top end thereof and second horizontal portion secured to the rear opening 20 of the housing 16. The vertical and horizontal portions of the reflector housing 30 are joined by the reflector 32 therein which comprises a reflective surface supported at a forty five degree inclination to the upright plane of the rear opening 20 to face partially upward towards the headlight 12 which is oriented to project downwardly onto the reflector. Accordingly the projected light from the headlight is reflected off of the reflector 32 to project through the housing 16 parallel to the main axis thereof.

An internal surface of the first side wall 22 is comprised of reflective material for assisting in projecting light towards a passenger side 34 of the vehicle when the first side wall 22 is mounted towards the driver side 36 of the vehicle in relation to the second side wall 24. Alternatively, the second side wall 24 includes a surface of non-reflective material to reduce the scatter of light towards the driver side 36 of the vehicle which the second side wall faces. The second side wall 24 is supported towards the passenger side of the vehicle in relation to the first side wall 22.

The panels forming the housing 16 are preferably formed of plastic material. A front panel 38 of clear material spans the front opening 18 to keep out debris and provide a sealed interior to the housing when the housing is coupled to the headlight 12 which seals the rear opening 20.

Turning now to FIG. 2, a first embodiment of the device 10 is illustrated in which the housing 16 comprises an open and unobstructed duct extending between the front and rear openings. Length of the housing between the front and rear openings is preferably in the order of about four inches with lateral width being approximately six and a half inches and height being approximately three inches. When supported within the bumper of a vehicle, the duct might be slightly longer in the order of six inches, however in all embodiments, the width in the lateral direction is typically greater than the length between the front and the rear openings. The housing is arranged such that the walls of the housing are formed of a light weight plastic material with the top side being opaque and the bottom side and front being clear.

Figure 3:
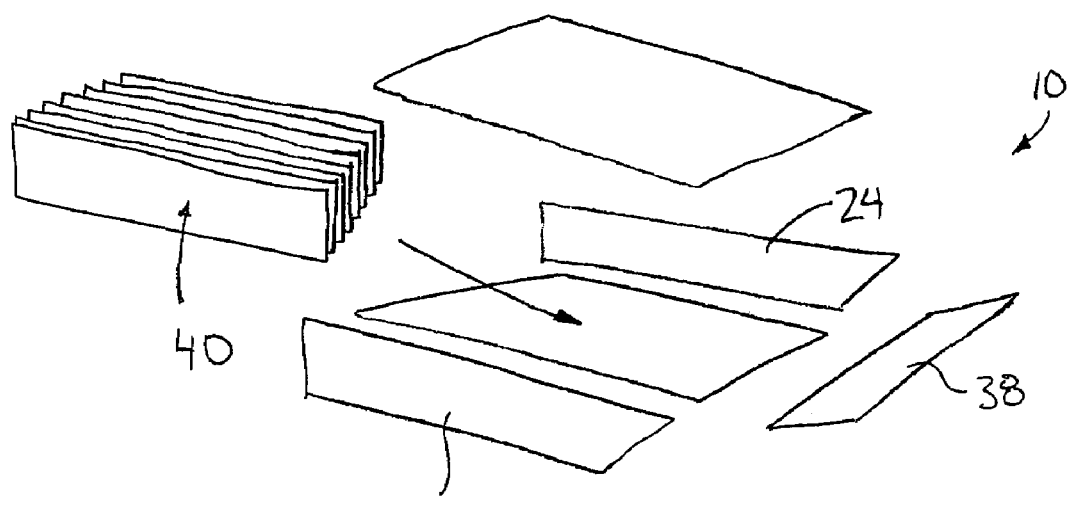
FIG. 3 is an exploded perspective view of the device including additional plates supported therein.
Figure 5:
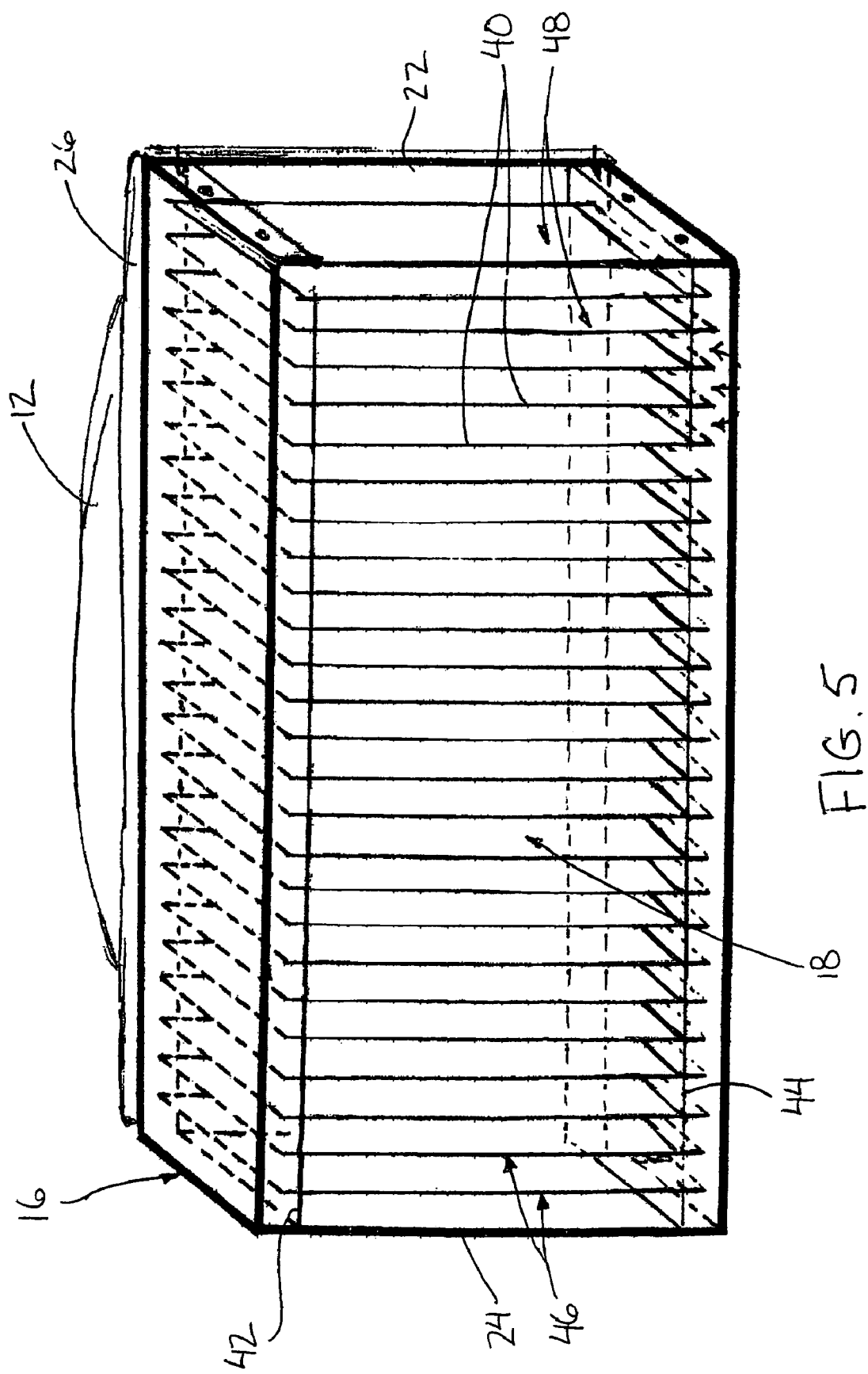

Turning now to the embodiment of FIGS. 3 through 5, the housing is arranged similarly to the embodiment of FIG. 2, however a plurality of reflector plates are supported within the housing. The housing may be round, oval or square to accommodate different styles of headlights. In each instance, a top header 42 and a bottom header 44 are supported at the top and bottom sides of the housing to support the reflector plates 40 spanning therebetween in a vertical orientation parallel to one another and spaced apart by approximately ⅛ to ¼ of an inch. The top and bottom headers may be formed of block of wood or plastic material having parallel slots formed therein which receive end portions of the reflector plates 40 respectively. Once the headers are fastened within the housing, the plates 40 are fixed in position within the housing parallel to the main axis thereof. Each plate includes a first reflective side 46 and a second non-reflective side 48. The first reflective sides are supported within the housing to face a common first direction towards the passenger side of the vehicle for maximizing light reflected away from oncoming traffic. Similarly the second non-reflective sides all face a common second direction towards the drivers side of the vehicle to limit the amount of light reflected towards oncoming traffic.

The dimensions of the illustrated embodiment are adapted to fit a standard sealed beam unit for a 1985 Dodge full size van. The top and bottom headers 42 and 44 span the top and bottom sides of the housing and have a depth in the order of one quarter of an inch. The slots formed therein are approximately one eighth of an inch deep for holding only a respective top or bottom edge of the plate therein. Self taping screws hold the headers within the housing for selective removal therefrom as required. The plates may be slotted at the back top and bottom corners to accommodate slipping the box over the headlight frames. Glue sealer and screws hold the housing onto the headlight.

Figure 7:
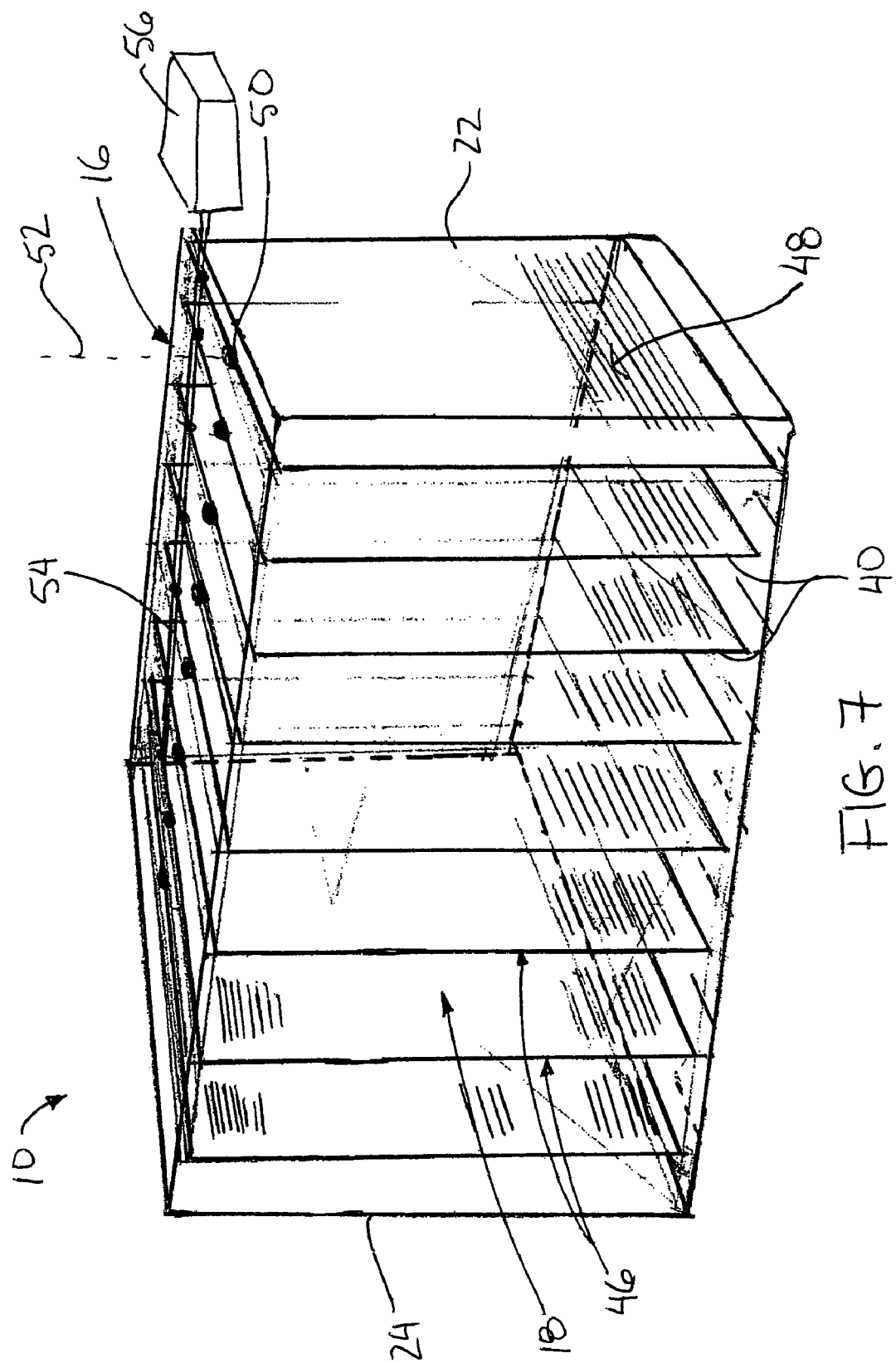
FIG. 7 is a perspective view of a further embodiment of the antiglare device including upright plates pivotal about respective upright axis between a high beam position and a low beam position.
Figure 8:
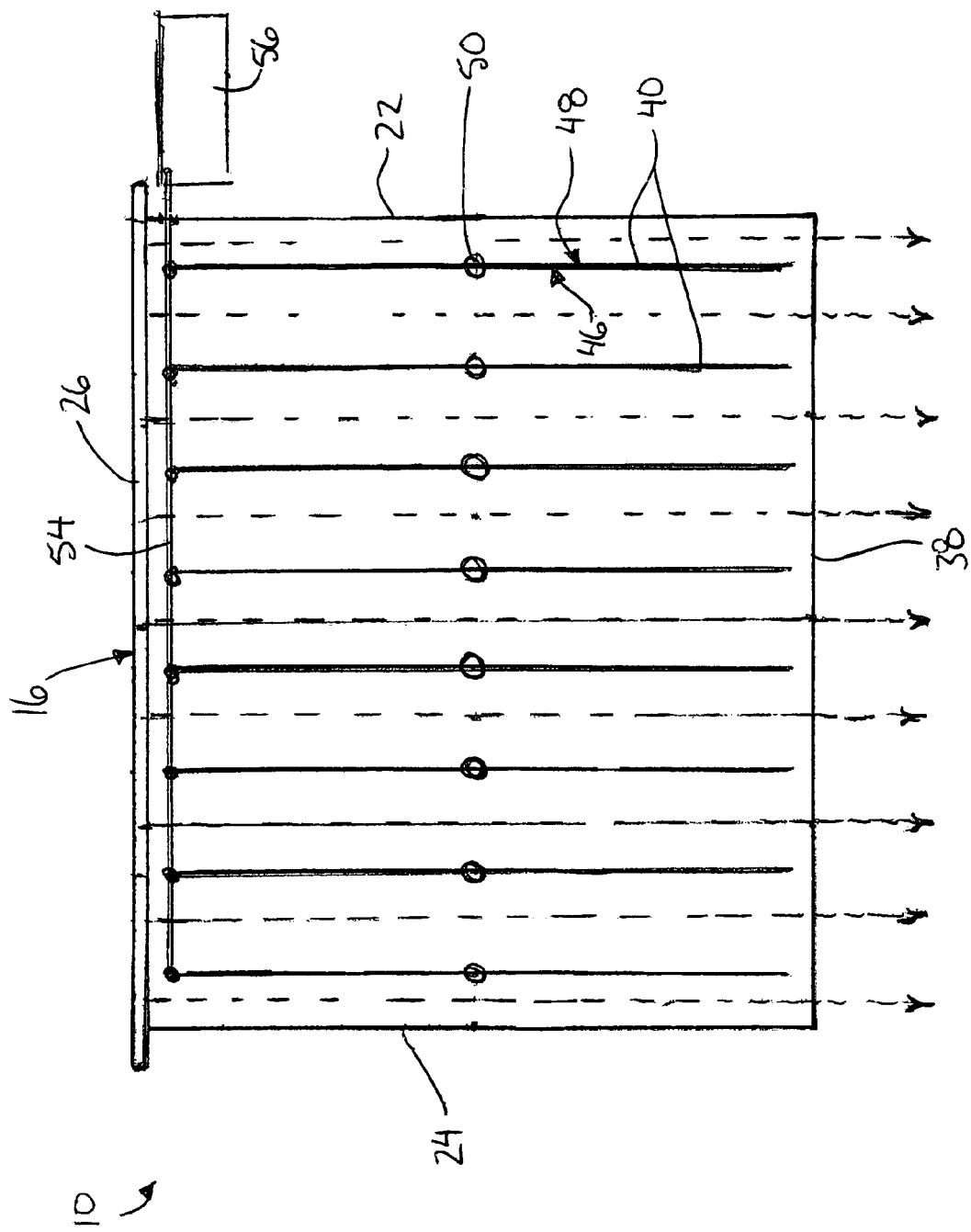
FIG. 8 and FIG. 9 are top plan views of the device according to FIG. 6 in the high beam and low beam positions respectively.
Figure 9:
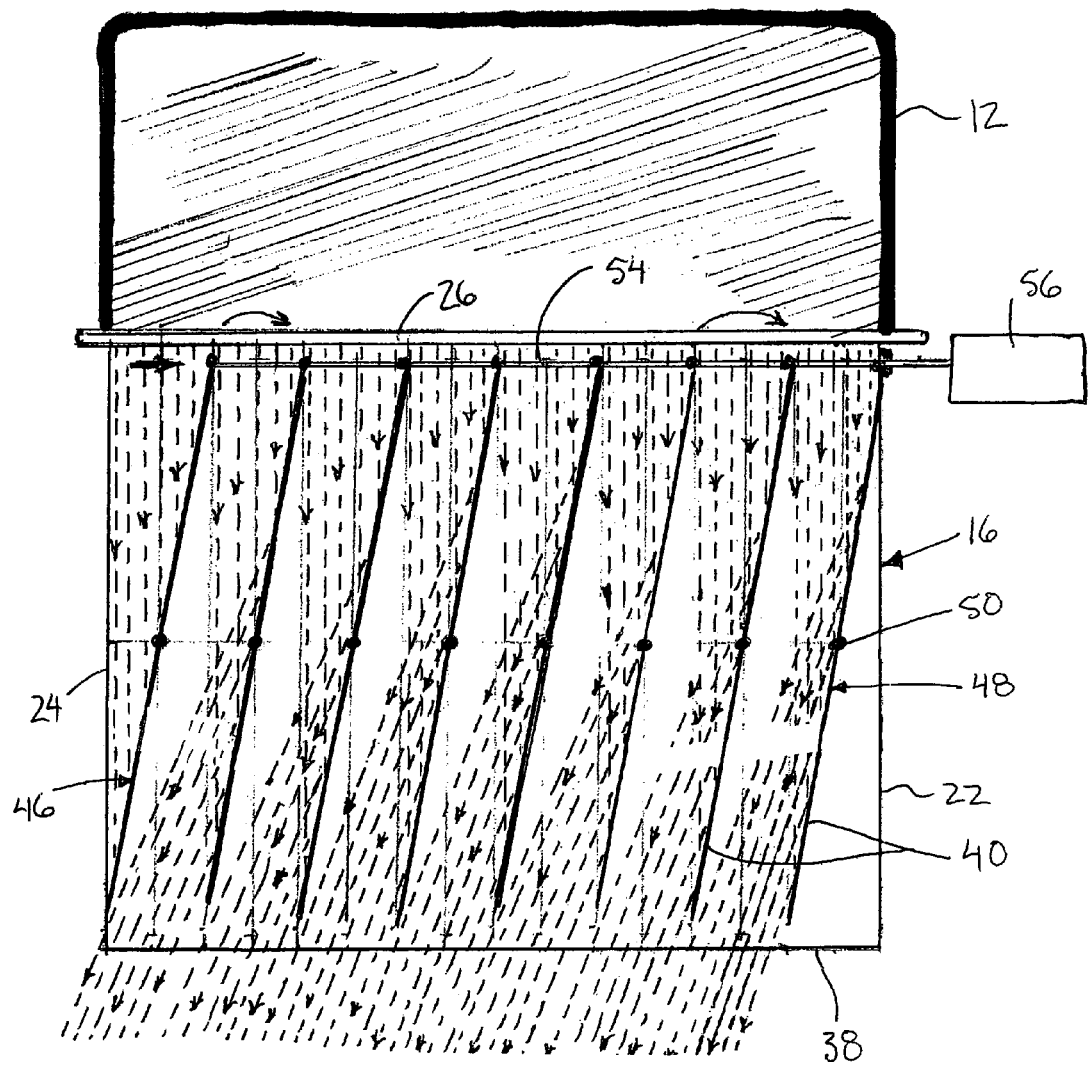

Turing now to the embodiment of FIGS. 7 through 9, the housing similarly includes reflector plates 40 therein having a first reflective side 46 and a second non-reflective side 48. The plates however as instead supported in a vertical orientation by respective pivot shafts 50 which support the plates for a pivotal movement about respective vertical axis 52. The pivot shafts are centered in the lengthwise direction of the plates between the front and the rear openings. The plates are linked together adjacent the rear ends thereof by a control rod 54 which is pivotally coupled to each plate so that all of the plates are pivoted commonly together as the control rod is axially displaced, A suitable actuator 56 is coupled to the control rod and includes suitable operator controls in the passenger compartment of the vehicle. The plates are actuated for pivotal movement between a high beam position as shown in FIG. 8 and a low beam position as shown in FIG. 9. In the high beam position, the plates are parallel to the main axis of the housing and accordingly are parallel to the path of projected light from the headlight through the housing. The reflective sides all commonly face towards the passenger side of the vehicle while the non-reflective sides all commonly face towards the driver side of the vehicle.

The plates are pivoted into the low beam position of FIG. 9 by displacing the front edges of the plates laterally towards the passenger side of the vehicle and away from oncoming traffic in relation to the rear edges of the plates so that the plates lie at an acute angle to the main axis. The plates are pivoted sufficiently that the front edges of each plate overlap the rear edge of an adjacent plate so that the light from headlight cannot be projected directly from the rear opening through to the front opening along the main axis. In the low beam position, the plates remain parallel to one another but the first reflective sides face partially rearwardly to concentrate the deflection of light laterally towards the passenger side of the vehicle.

The housing generally consists of a plastic box containing eight plates suspended at their centers on pivot points and joined together at the rear by the control rod. At high beam, the plates are parallel with the light beam, however at low beam the control rod moves the rear edges of the plates towards the driver side causing the light beam to be deflected towards the shoulder of the road away from oncoming traffic. The amount of light projected is not reduced but only deflected so that ample light is still provided for the driver's vision at the same time as greatly reducing headlight glare for oncoming traffic. Spacing of the plates in the illustrated embodiment is five eighths of an inch between each pair of adjacent plates.

Figure 10:
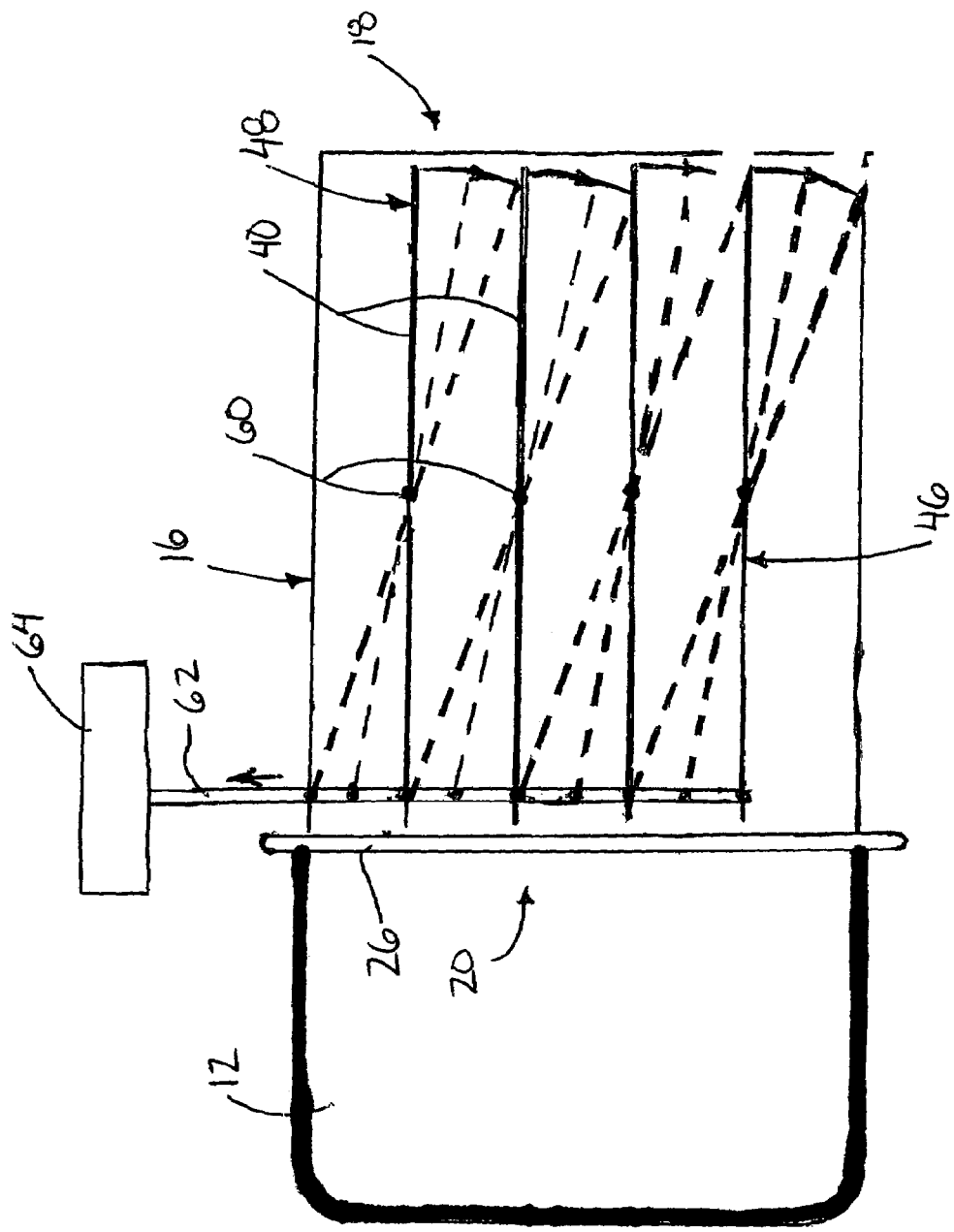
FIG. 10 is a side elevational view of another embodiment of the antiglare device in which horizontal plates are supported for pivotal movement about respective horizontal axis.

Turning now to FIG. 10, a further embodiment of the antiglare device is illustrated in which reflector plates 40 are similarly provided, but are supported in a generally horizontal configuration in the high beam position. Each of the plates is pivoted about a respective pivot shaft 60 having a horizontal axis extending centrally through the plate in the longitudinal direction between the front and rear openings of the housing. A control rod 62 is similarly linked between all of the plates by pivotal connections thereto so that the plates remain parallel to one another as they are pivoted between the high beam and the low beam positions thereof respectively.

An actuator 64 having pneumatic control is coupled to the control rod for displacing the rod between the high beam and the low beam positions respectively. The actuator 64 is similarly operated by operator controls within the passenger compartment of the vehicle. In the high beam position the plates are generally horizontal and parallel to the main axis with the first reflective sides being on a bottom side of the plates to face generally downwardly while the non-reflective sides are at a top side of the plate facing upwardly.

When pivoted into the low beam position, the front edges of the plates are pivoted downwardly in relation to the rear edges of the plates until all of the plates are at an acute angle relative to the main axis with the front edges overlapping the rear edges of an adjacent plate in the vertical direction so that light projected from the headlight cannot pass directly from the rear opening through to the front opening of the housing. The first reflective sides thus face downwardly and partially rearwardly in the low beam position to assist in deflecting light in the direction which the reflective surfaces face.

In the embodiment of FIG. 10, four plates are provided at a spacing therebetween of approximately five eighths of an inch, though this spacing is optional by simply adjusting the angle at which the plates are pivoted to in the low beam position. In the illustrated embodiment, the plates are shown in dashed line pivoted into both a first low beam position and a second low beam position in which the first low beam position is at greater inclination relative to the main axis resulting in a very low beam. In the second low beam position, the plates are at less of an inclination resulting in only a moderately low beam as compared to the first low beam position. In each instance, the high beam will be slightly dissipated by the plates but the reflective mirrors on the bottom sides will increase intensity of the beam projected downwardly.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A headlight antiglare device for use in conjunction with a headlight of a vehicle, the device comprising:
   a housing having a rear opening, a front opening, a first side wall and a second side wall, the side walls defining a passage extending through the housing along a main axis of the housing between the rear opening and the front opening;
   a mount arranged for receiving the headlight in the rear opening such that the headlight shines through the housing along the main axis, the first side wall faces a passenger side of the vehicle and the second side wall faces a driver side of the vehicle;
   the first side wall having a reflective surface; and
   the second side wall having a non-reflective surface.

2. The device according to claim 1 wherein there is provided a plurality of plates supported within the housing in a fixed orientation, spaced apart from one another and parallel to the main axis of the housing.

3. The device according to claim 2 wherein each plate includes a first reflective side and a second non-reflective side, the plates being supported within the housing such that the first reflective sides face a common first direction and the second non-reflective sides face an opposing common second direction.

4. The device according to claim 1 wherein the mount supports the housing recessed within a bumper of the vehicle.

5. A headlight antiglare device for use in conjunction with a headlight of a vehicle, the device comprising:
   a housing having a rear opening, a front opening and a passage extending through the housing along a main axis of the housing between the rear opening and the front opening;
   a mount arranoed for receiving the headlight in the rear opening such that the headlight shines through the housing along the main axis;
   a plurality of plates supported within the housing in an upright orientation, spaced apart from one another and parallel to the main axis of the housing;
   each nlate including a first reflective side and a second non-reflective side; and
   the plates being supported within the housing such that the first reflective sides face a passenger side of the vehicle and the second non-reflective sides face a driver side of the vehicle.

6. The device according to claim 5 wherein there is provided a controller coupled to the plates for moving the plates together between the high beam and low beam positions respectively, the controller being operable by operator controls within the passenger compartment of the vehicle.

7. The device according to claim 5 wherein the mount supports the housing recessed within a bumper of the vehicle.

8. The device according to claim 5 wherein the plates are movable between a high beam position in which the plates are substantially parallel to the main axis of the housing and a low beam position in which the plates lie parallel to one another at an acute angle to the main axis.

9. The device according to claim 8 wherein the plates are upright in the high beam position and are pivotal about respective upright axes between the high and low beam positions.

10. The device according to claim 8 wherein the plates are substantially horizontal in the high beam position and are pivotal about respective horizontal axes between the high and low beam positions.

11. The device according to claim 8 wherein each plate includes a first reflective side and a second non-reflective side and wherein the first reflective sides face partially rearward in the low beam position.

12. The device according to claim 8 wherein the mount supports the housing recessed within a bumper of the vehicle.

13. The device according to claim 8 wherein the mount comprises a reflector facing the rear opening at an upward facing 45 degree inclination thereto and a support flange for supporting the headlight facing downwardly above the reflector.

14. The device according to claim 8 wherein the first reflective sides face partially rearward in the low beam position.

15. The device according to claim 14 wherein the plates are substantially horizontal in the high beam position and wherein the first reflective sides face generally downward.

16. The device according to claim 5 wherein the plates have a fixed orientation substantially parallel to the main axis.

17. A headlight antiglare device for use in conjunction with a headlight of a vehicle, the device comprising:
   a housing having a rear opening, a front opening and a passage extending through the housing along a main axis of the housing between the rear opening and the front opening;
   a mount arranged for receiving the headlight in the rear opening such that the headlight shines through the housing along the main axis;
   a plurality of plates supported within the housing in an upright orientation, spaced apart from one another and parallel to the main axis of the housing; and
   the plates being pivotal about respective upright axes between a high beam position in which the plates are upright and substantially parallel to the main axis of the housing and a low beam position in which the plates lie parallel to one another at an acute angle to the main axis.

18. A headlight antiglare device for use in conjunction with a headlight of a vehicle, the device comprising:
   a housing having a rear opening, a front opening and a passage extending through the housing along a main axis of the housing between the rear opening and the front opening;
   a mount arranged for receiving the headlight in the rear opening such that the headlight shines through the housing along the main axis; and
   a plurality of plates supported within the housing in an upright orientation, spaced apart from one another and parallel to the main axis of the housing;
   the plates being movable between a high beam position in which the plates are substantially parallel to the main axis of the housing and a low beam position in which the plates lie parallel to one another at an acute angle to the main axis; and
   the mount comprising a reflector facing the rear opening at an upward facing 45 degree inclination thereto and a support flange for supporting the headlight facing downwardly above the reflector.

* * * * *